Patented Apr. 11, 1939

2,153,711

UNITED STATES PATENT OFFICE 2,153,711

THIOBARBITURIC ACID COMPOUNDS

Arthur W. Dox, Windsor, Ontario, Canada, assignor to Parke, Davis & Company, Detroit, Mich., a corporation of Michigan No Drawing. Application March 16, 1934, Serial No. 715,998

4 Claims. (Cl. 260—260)

The invention relates to 5—5 di-substituted thiobarbituric acid compounds and more particularly to that class of thiobarbituric acid compounds where one of the substituents is an alkyl radical having from 3 to 7 carbon atoms inclusive and the other substituent is a member of the group comprising ethyl, allyl, aryl, and aralkyl.

I have not only prepared for the first time a large number of specific compounds coming within the above new class but have also discovered unexpected new therapeutic properties rendering the same commercially valuable. I have discovered that a large number of these compounds are especially valuable as hypnotics and are suitable for other medical and pharmaceutical uses, including treatment of epilepsy and as sedatives, etc. Furthermore, the new compounds are of value as intermediates for the preparation of other chemical substances and physiologically and pharmaceutically valuable compositions.

The new compounds may be represented by the formula:

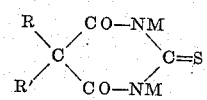

in which R represents a saturated or unsaturated alkyl radical having from 3 to 7 carbon atoms inclusive; R' represents an organic radical of the class comprising ethyl, allyl, aryl and aralkyl. In order to better understand the type of compounds included under this formula, they are divided into three groups as follows:

I

In this group R of the above formula is the ethyl radical ($C_2H_5$). The other substituent R' is generally a saturated alkyl radical of 3 to 7 carbon atoms, but in some cases may be an unsaturated alkyl radical, e. g., allyl or an aryl or aralkyl radical, such as phenyl or benzyl or phenethyl. One M in the formula is hydrogen and the other M is hydrogen or a salt-forming basic group capable of replacing the hydrogen of the imino group.

II

In the second group the R of the above formula is the allyl radical ($CH_2=CH-CH_2$). R' is a member of the group comprising a saturated or unsaturated alkyl radical having from 3 to 7 carbon atoms inclusive, and aryl and aralkyl, and one M is hydrogen and the other M is hydrogen or a salt-forming basic group capable of replacing the hydrogen of the imino group.

III

Here the R of the above formula is a saturated alkyl radical having from 3 to 7 carbon atoms inclusive. R' is an aryl or aralkyl group, and one M is hydrogen and the other M is hydrogen or a salt-forming basic group capable of replacing the hydrogen of the imino group.

By the above expression "salt-forming basic group capable of replacing the hydrogen of the imino group" is meant groups such as ammonium, alkali metals such as potassium, sodium, rubidium, caesium, alkaline earth metals such as calcium, strontium and barium, including magnesium. These groups are well known as characteristic groups for the replacement of the imino hydrogen of barbituric and thiobarbituric acids to form salts.

Although the compounds of the new class are valuable in a general chemical sense, it has been found that they also have exceptionally valuable properties of a special nature. For example, there have been prepared and tested physiologically a whole series of new thiobarbituric acid compounds coming within the invention and it has been found that they are almost without exception active hypnotic substances, some of which are outstanding in this respect, and much more effective than any similar hypnotic substances now known. Many of them are noteworthy for the comparatively long time during which their physiological effects are manifest and the absence of undesirable side reactions to the animal or human organism to which they are administered.

I have prepared, examined and tested a large number of specific new compounds coming within the new class forming the subject matter of the invention. By way of illustrating the invention, the following thiobarbituric acid compounds will serve as examples:

Ethyl n-propyl thiobarbituric acid, ethyl iso-propyl thiobarbituric acid, ethyl n-butyl thiobarbituric acid, ethyl iso-butyl thiobarbituric acid, ethyl secondary butyl thiobarbituric acid, ethyl iso-amyl thiobarbituric acid, ethyl n-amyl thiobarbituric acid, ethyl 1-methyl butyl thiobarbituric acid, ethyl 2-methyl butyl thiobarbituric acid, ethyl beta-ethyl butyl thiobarbituric acid, ethyl n-hexyl thiobarbituric acid, ethyl n-heptyl thiobarbituric acid, ethyl secondary heptyl thiobarbituric acid, ethyl allyl thiobarbituric acid, ethyl phenyl thiobarbituric acid, ethyl benzyl thiobarbituric acid, allyl n-propyl thiobarbituric acid, allyl iso-propyl thiobarbituric acid, allyl n-butyl thiobarbituric acid, allyl secondary butyl thiobarbituric acid, allyl iso-amyl thiobarbituric acid, allyl n-hexyl thiobarbituric acid, allyl beta-ethyl butyl thiobarbituric acid, allyl n-heptyl thiobarbituric acid, allyl secondary heptyl thiobarbituric acid, allyl phenyl thiobarbituric acid, allyl phenethyl thiobarbituric acid, allyl benzyl thiobarbituric acid, diallyl thiobarbituric acid, n-propyl phenyl thiobarbituric acid, iso-propyl phenyl thiobarbituric acid, butyl phenyl thiobarbituric acid, amyl phenyl thiobarbituric acid, iso-amyl phenyl thiobarbituric acid, ethyl phenethyl thiobarbituric acid, n-propyl phenethyl thiobarbituric acid, iso-amyl iso-propyl phenethyl thiobarbituric acid, iso-butyl phenethyl thiobarbituric acid, iso-propyl benzyl thiobarbituric acid, butyl benzyl thiobarbituric acid, and iso-amyl benzyl thiobarbituric acid.

All of the above thiobarbituric acids can be converted to their salts whether soluble or insoluble by neutralizing with the proper amount of salt-forming base. Thus the invention includes the alkali metal, alkaline earth metal, magnesium or ammonium salts of the new group of thiobarbituric acids.

Generally speaking, it is a common property of the new thiobarbituric acids that, where the thiobarbituric acid possesses hypnotic properties, the corresponding solution of its alkali metal, alkaline earth metal, magnesium or ammonium salt when injected into the human or animal organism also produces hypnosis of a similar order. Another common property of the new compounds having hypnotic properties is that the period of onset of hypnosis is greatly reduced, so that one may expect, when considering a given barbituric acid having hypnotic properties, that its corresponding sulfur analog, or thiobarbituric acid, will not only have hypnotic properties but will begin to exercise such properties after administration in a much shorter time. The same relationship exists between the salts of the acids. This short period during which onset of hypnosis occurs is of great practical importance. In the case of ethyl iso-amyl thiobarbituric acid, ethyl 1-methyl butyl thiobarbituric acid, ethyl n-butyl thiobarbituric acid and allyl secondary butyl thiobarbituric acid and their salts, onset of hypnosis after oral administration occurs quickly, for example within 5 minutes for white rats, and is entirely free from side reactions such as pre-anesthetic or post-anesthetic excitement. Duration of hypnosis for these four compounds is from four to as long as seven hours and their ratio of maximum tolerated dose to minimum effective dose considerably exceeds, generally speaking, that of the known hypnotics. Hence, it is obvious that these are practically ideal hypnotics for most purposes. However, I prefer ethyl iso-amyl thiobarbituric acid among these four excellent hypnotics, since its duration of hypnosis compared with the others stands at a more nearly medium value of about four hours. It is also valuable in the treatment of epilepsy and may serve well in spinal anesthesia and is preferred for other reasons.

Among the new compounds which are valuable as hypnotics it appears that the presence of the sulfur atom in the molecule practically entirely eliminates irritation and pre-anesthetic and post-anesthetic excitement, so that in passing from a given barbituric acid to its corresponding analog in the thiobarbituric acid series of the invention, the latter does not produce side reactions, whereas the barbituric acid may do so.

Another valuable property of those of the new compounds having hypnotic properties is that certain desirable variations occur in their properties making it possible to choose the particular kind of hypnotic most suited for any particular use. For example, if for any reason it is desired that hypnosis be delayed, instead of using one of the four preferred compounds or their salts given above, there may be used compounds whose action is not apparent until two, three or four or more times as long as that needed (5 minutes for white rats) for the preferred compounds. By way of illustration, diallyl thiobarbituric acid (action after 10 minutes), ethyl iso-propyl thiobarbituric acid (action after 15 minutes), and ethyl n-propyl thiobarbituric acid (action after about 20 minutes) may be used. These latter compounds although not having quite as high a ratio of maximum tolerated dose to minimum effective dose as the four preferred compounds mentioned above, nevertheless have a ratio as high as that of known hypnotics, such as diethyl barbituric acid, and are like the four mentioned in being free from side reactions and giving a deep hypnosis. The same may be said of other hypnotics within the new group of compounds, such as ethyl n-hexyl thiobarbituric acid having an action beginning within 5 minutes and lasting three to four hours.

Generally, it has been found that compounds, such as diethyl thiobarbituric acid having alkyl groups with less than 3 carbon atoms, which are outside of the new group are less effective, if they have any hypnotic properties at all, and their ratios of maximum tolerated dose to minimum effective dose are considerably less than those of the new compounds having hypnotic properties.

The new compounds are made by methods well known for the preparation of barbituric acids and no special comments are necessary; yet for convenience and clarity I give the following illustrative examples:

*Example 1.*—*(Ethyl iso-amyl thiobarbituric acid)*

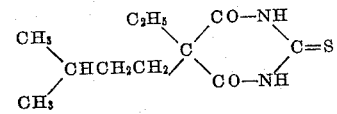

23 grams (1 mole) of metallic sodium was dissolved in about 300 cubic centimeters of absolute ethyl alcohol and 86 grams (0.33 mole) of ethyl iso-amyl malonic ester (i. e. ethyl ethylisoamylmalonate) and 32 grams (0.42 mole) of thiourea added. The mixture was refluxed in an oil bath at 95° C. for about seven hours. It was then allowed to evaporate spontaneously over night to give a viscous residue. The residue was then dissolved in about 200 cc. of distilled water and concentrated hydrochloric acid (36%) added slowly with stirring until the mixture was very faintly acid to litmus. The free ethyl iso-amyl thiobarbituric acid thus was precipitated in crystalline form. The crystals were filtered off and washed thoroughly with distilled water and dried at about 50 to 60° C. The product was then recrystallized by dissolving in hot 95% alcohol to form a concentrated solution from which the pure product separated almost quantitatively by addition of about ½ volume of water to the alcoholic solution and allowing to cool. The scaly lustrous crystals, filtered off and dried, were almost white but had a very slight yellow cast. Their melting point was 179° C. (corr.). The crystals were practically tasteless, readily soluble in dilute alkalies, soluble in alcohol, ether, benzene and chloroform, soluble with difficulty in water and insoluble in petroleum ether.

*Example 2.—(Ethyl n-hexyl thiobarbituric acid)*

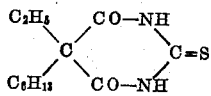

34.5 grams (1.5 moles) of metallic sodium were dissolved in about 500 cc. of absolute ethyl alcohol. 136 grams (0.5 mole) of ethyl n-hexylethylmalonate was then added slowly along with 57 grams (0.75 mole) of thiourea. The mixture, after refluxing 4½ hours in an oil bath at 100° C. was allowed to evaporate to a viscous mass. This mass was then taken up in distilled water and very slightly acidified to litmus to give shiny scales. These scaly crystals were then recrystallized once from methanol and the dried crystals were found to have a melting point of 135° C. The shiny, lustrous crystals were almost white but had a very pale yellow cast. The solubility was the same as that given for the product of Example 1 above. The crystals were also tasteless and odorless.

*Example 3.—(Sodium salt of ethyl isoamyl thiobarbituric acid)*

A weighed quantity of the ethyl iso-amyl thiobarbituric acid of Example 1 was dissolved in the exact equivalent of normal sodium hydroxide. The mixture was filtered to remove any minute amounts of undissolved acid and the filtrate evaporated under a partial vacuum at about 60° C. to a clear viscous mass which eventually dried down to a slightly yellow brittle mass which was then easily pulverized to a very pale yellow powder. This powder was readily soluble in water and alcohol and, unlike the tasteless acid from which it was obtained, had a distinctly bitter taste.

*Example 4.—(Magnesium salt of ethyl isoamyl thiobarbituric acid)*

A weighed quantity of the ethyl iso-amyl thiobarbituric acid of Example 1 in finely powdered form was suspended in water and a slight excess of 7% milk of magnesia added. The mixture was warmed to about 60° C. for several hours, cooled, and undissolved free acid and excess of magnesium hydroxide filtered off. The aqueous filtrate was evaporated under diminished pressure at about 60° C. The product obtained was a white solid residue which had a bitter taste and was rather readily soluble in water.

Other compounds of the invention are prepared in a manner similar to the above examples. The free acids are well defined crystalline compounds which vary from tasteless to bitter and from white to distinctly yellow. Their melting points generally lie considerably above the temperature of boiling water, as will be illustrated by the following representative examples:

| Compound | Melting point |
|---|---|
|  | (degrees C.) |
| Ethyl n-propyl thiobarbituric acid | 176 |
| Ethyl iso-propyl thiobarbituric acid | 192 |
| Ethyl n-butyl thiobarbituric acid | 142 |
| Ethyl iso-amyl thiobarbituric acid | 179 |
| Ethyl n-hexyl thiobarbituric acid | 135 |
| Ethyl 1-methyl butyl thiobarbituric acid | 156 |
| Diallyl thiobarbituric acid | 146–147 |
| Allyl benzyl thiobarbituric acid | 200–202 |
| Butyl benzyl thiobarbituric acid | 189 |
| Ethyl phenyl thiobarbituric acid | 218 |
| Ethyl phenethyl thiobarbituric acid | 154–155 |
| Secondary butyl allyl thiobarbituric acid | 147 |

The acids may be reacted with basic substances such as amines to form substituted ammonium salts which for many purposes are the equivalent of the ammonium salts and as such are included within the scope of the invention. The new salts of the acids may also be reacted chemically to produce further new and useful compositions which may or may not be of value in the narrow pharmaceutical or medical sense. In other words, the invention is not limited to compounds having hypnotic properties but in the broad sense covers a new group of chemical individuals having certain common characteristics as already described and as defined by the claims appended hereto.

Some of the new compounds disclosed but not claimed herein form the subject matter of my divisional application, Serial No. 251,256, filed January 16, 1939.

I claim as my invention:

1. An ethyl isoamyl thiobarbiturate.
2. Ethyl isoamyl thiobarbituric acid.
3. The sodium salt of ethyl isoamyl thiobarbituric acid.
4. Sedative, hypnotic and sleep-producing compounds having the formula

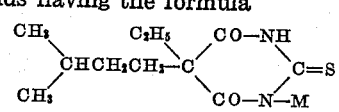

where M is a member of the class consisting of hydrogen and a salt-forming basic group capable of replacing the hydrogen of the imino group.

ARTHUR W. DOX.